(12) United States Patent
Bisarello

(10) Patent No.: US 9,739,302 B2
(45) Date of Patent: Aug. 22, 2017

(54) DEVICE FOR ADJUSTING THE TENSIONING OF A CONTROL CABLE OF A BICYCLE GEARSHIFT

(71) Applicant: Campagnolo S.r.l., Vicenza (IT)

(72) Inventor: Filippo Bisarello, Caldogno (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/733,290

(22) Filed: Jun. 8, 2015

(65) Prior Publication Data

US 2015/0354621 A1    Dec. 10, 2015

(30) Foreign Application Priority Data

Jun. 9, 2014    (IT) ............................. MI20140194 U

(51) Int. Cl.
*F16C 1/22* (2006.01)
*B62M 25/02* (2006.01)

(52) U.S. Cl.
CPC ............. *F16C 1/223* (2013.01); *B62M 25/02* (2013.01); *F16C 1/226* (2013.01); *F16C 2326/28* (2013.01); *Y10T 74/20462* (2015.01)

(58) Field of Classification Search
CPC ............ F16C 1/22; F16C 1/223; B62M 25/02
USPC ......................................... 74/501.5 R, 502.6
See application file for complete search history.

(56) References Cited

U.S. PATENT DOCUMENTS

| | | | | |
|---|---|---|---|---|
| 4,464,950 | A * | 8/1984 | Deligny | F16C 1/226 74/501.5 R |
| 4,798,100 | A * | 1/1989 | Baumgarten | B62L 3/00 188/196 B |
| 4,833,937 | A * | 5/1989 | Nagano | B62M 9/127 474/82 |
| 5,746,094 | A * | 5/1998 | Medebach | F16C 1/226 74/501.5 R |
| 6,272,948 | B1 * | 8/2001 | Klippert | E05F 11/485 74/500.5 |
| 2007/0293722 | A1 * | 12/2007 | Casalini | F16C 1/226 600/121 |

* cited by examiner

*Primary Examiner* — Vicky Johnson
(74) *Attorney, Agent, or Firm* — Volpe and Koenig, P.C.

(57) ABSTRACT

An adjustment device for tensioning a bicycle gearshift control cable. The adjustment device has opposed threaded elements and a compressible element, which is retained in position by a locking member and compressed between the threaded elements.

10 Claims, 5 Drawing Sheets

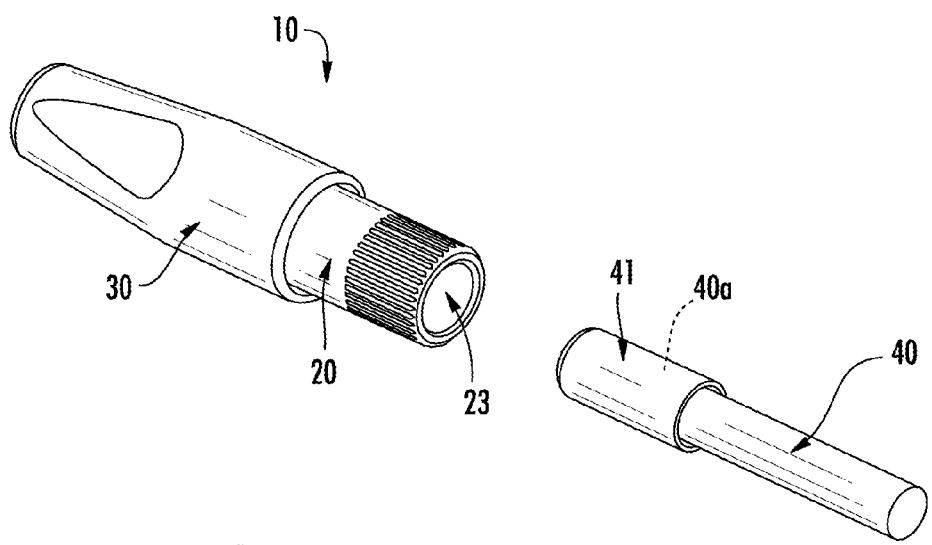
FIG. 2
FIG. 3
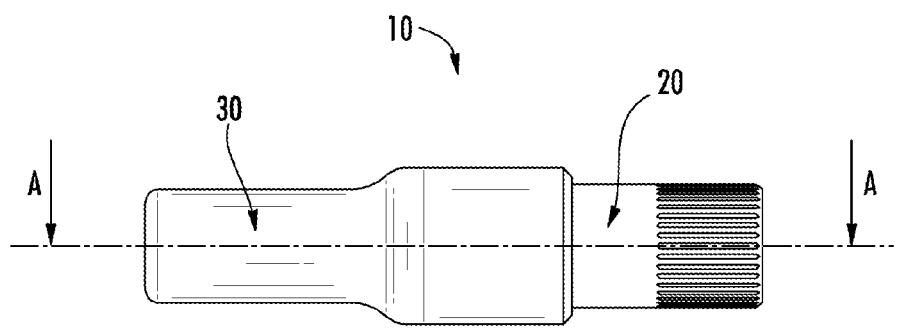
FIG. 4

DEVICE FOR ADJUSTING THE TENSIONING OF A CONTROL CABLE OF A BICYCLE GEARSHIFT

FIELD OF INVENTION

The present invention relates to a device for adjusting the tensioning of a control cable of a bicycle gearshift.

BACKGROUND

The technical field of the present invention is preferably that of racing bicycles.

SUMMARY

In the present application, the term "bicycle gearshift" is used to indicate, without distinction, the front gearshift or the rear gearshift, where the term "gearshift" is used to indicate the assembly of members arranged near the chain and used to move the chain between the different toothed crowns (or toothed wheels) that form the so-called crankset of the bicycle (in the front gearshift), or between the different sprockets that form the so-called sprocket assembly of the bicycle (in the rear gearshift). Typically, in racing bicycles the crankset comprises two or three toothed crowns and the sprocket assembly comprises ten or eleven sprockets.

The bicycle gearshifts which are referred to are manually actuated.

In such gearshifts the movement of the chain generally occurs through the movement of a suitable thrusting member, commonly called cage, associated with an actuation kinematic mechanism that, deforming following the manual action exerted by the cyclist on a suitable control member (typically arranged at the handlebars of the bicycle), moves the chain from one toothed crown to another (in the front gearshift) or from one sprocket to the other (in the rear gearshift). The actuation linkage is in turn associated with a body that is fixed to the frame of the bicycle, typically to the seat post tube of the frame (namely the one arranged beneath the saddle) for the front gearshift and to the fork of the rear wheel for the rear gearshift.

The action exerted by the cyclist on the control member is transferred to the thrusting member through a cable connected to the aforementioned members.

In this description and in the following claims, "cable" is used to indicate an elongated element (typically metallic, for example made of steel) that runs inside one or more protective sheaths (in the case of more sheaths, each sheath protects a different length of the cable).

Each sheath typically comprises three layers, and specifically an outer coating made of elastomeric material, a spiral winding (for example of a flat metallic wire, of a round metallic wire or of a plurality of round metallic wires) and an inner anti-wear coating.

The spiral winding allows the sheath to maintain a constant shape, gives rigidity to the sheath and allows the sheath to be bent.

The inner coating allows the friction between the spiral winding and the cable running therein to be reduced.

In order to allow the movement of the thrusting member through the cable following the action of the cyclist on the control member, it is necessary, in the mounting step, for the cable to be suitable placed under tension between the control member and the thrusting member. For this purpose an indexing register is used that allows the adjustment of the tension of the cable so that a predetermined movement of the control member (upward or downward gearshifting) corresponds to a predetermined movement of the thrusting member, the latter being suitable for precisely moving the chain from one toothed wheel to the adjacent toothed wheel (in the front gearshift) or from one sprocket to the adjacent sprocket (in the rear gearshift).

Hereafter, the condition of correct tensioning at which the cable is placed in the assembly step is also indicated as "optimal tensioning condition".

It is known that, during use of the bicycle, due to the continuous stresses to which the gearshift and the control cable are subjected, the correct tensioning of the cable can be lost. This leads to a progressive decrease in precision of gearshifting, or in any case malfunctioning of the gearshift (even to the extent of making gearshifting impossible).

In the case of the rear gearshift, in order to bring the tensioning of the cable back to the optimal tensioning condition (in the jargon, this operation is called re-calibrating the tensioning of the cable), it is known to provide a suitable adjustment screw on the gearshift. The screwing/unscrewing of the screw leads to a corresponding movement of the thrusting member and, consequently, an adjustment of the tensioning of the cable.

Adjustment devices different from the aforementioned adjustment screw and suitable for allowing the adjustment of the tensioning of the control cable of the rear gearshift or of the front gearshift have also been proposed.

A prior art adjustment device is shown in FIG. 1. Such an adjustment device (indicated with 100) comprises a pair of elements 200, 300 coupled to each other through respective threadings 210, 310 extending along a longitudinal axis X.

Each element 200, 300 comprises a respective through cavity 220, 320 extending along said longitudinal axis X for the passage of the cable (not shown).

The element 200 comprises an end portion 200a provided with an outer threading 210 and, at an opposite end portion 200b thereof, a housing seat 230 for housing an end portion of a protective sheath (not shown) of a first length of the cable, namely the length of cable comprised between the thrusting member and the adjustment device 100. The opposite end portion of the aforementioned sheath is associated with the thrusting member.

The element 300 comprises an end portion 300a, shaped substantially like a cup and provided with an inner threading 310 that engages with the outer threading 210 of the element 200.

At a free end portion 300b thereof distal from the element 200, the element 300 comprises a housing seat 330 for an end portion of a protective sheath (not shown) of a second length of the cable, namely the length of cable comprised between the control member and the adjustment device 100. The opposite end portion of the aforementioned sheath is associated with the control member.

The cyclist, by unscrewing (or screwing) the element 200 with respect to the element 300, moves the protective sheath of the first length of cable. This results in a movement of the thrusting member and the consequent movement of the cable. The screwing/unscrewing is stopped when the cable is brought back to the optimal tensioning condition thereof.

The Applicant has observed that with the continuous use of the bicycle, the two elements 200, 300 of the adjustment device 100 can slightly unscrew from each other, thus losing the optimal tensioning condition of the cable.

The present invention provides a device for adjusting the tensioning of a control cable of a bicycle gearshift that makes it possible to prevent the aforementioned unscrewing.

The present invention therefore relates to a device for adjusting the tensioning of a control cable of a bicycle gearshift according to claim 1.

Preferred features of the aforementioned device are recited in claims 2-10.

In particular, the present invention relates to a device for adjusting the tensioning of a control cable of a bicycle gearshift, comprising a pair of elements coupled to each other through respective threadings extending along a longitudinal axis, each element of said pair of elements comprising a respective through cavity extending along said longitudinal axis for the passage of said cable, wherein:

a first element of said pair of elements comprises an end portion provided with an outer threading and, at an opposite end portion thereof, a first housing seat for housing an end portion of a first protective sheath of a first length of said cable;

a second element of said pair of elements comprises a hollow portion provided with an inner threading engaged with said outer threading and, at a free end portion thereof distal from said first element, a second housing seat for housing an end portion of a second protective sheath of a second length of said cable;

said adjustment device further comprising a helical spring arranged coaxially to said outer threading and held in a compressed state between a first shoulder defined in said first element and a second shoulder defined in said second element and, at at least one of said first and second shoulders, a plurality of locking grooves for locking a respective free end of said helical spring.

Road tests carried out by the Applicant have shown that the aforementioned adjustment device allows preventing the unscrewing of the aforementioned two elements and, consequently, losing the optimal tensioning condition of the control cable of the gearshift.

Indeed, the provision of the helical spring—held in a compressed state between the shoulders defined in the first and second elements—causes a significant increase in the friction between the threadings of the two elements, defining a first minimum torsion threshold value to be overcome in order to have a relative rotation of the two elements. Moreover, the provision of the plurality of locking grooves for locking the free end of the helical spring defines a higher threshold value, being indeed necessary to apply a torsion such as to cause the free end of the spring to come out from the groove in which it is housed. Such a threshold value can be exceeded when the cyclist deliberately acts on the adjustment device to obtain the optimal tensioning condition, whereas it is not exceeded during normal use of the bicycle on the road.

The adjustment device of the present invention can comprise one or more of the following preferred features, taken individually or in combination with each other.

Preferably, said plurality of grooves extends along a substantially radial direction with respect to said longitudinal axis.

Throughout the present description and in the subsequent claims, the expression "substantially radial direction" is used to indicate a direction that has at least, or only, one component along any radial direction with respect to the aforementioned longitudinal axis.

In a preferred embodiment of the present invention, said plurality of grooves is made on a washer which is n abutment on one of said first and second shoulders. Advantageously, in terms of production, it is easier and cost-effective to make such grooves on a washer rather than to machine the respective shoulder.

However, there is an alternative embodiment in which said plurality of grooves is made on said first shoulder.

Preferably, said washer is in abutment on said first shoulder.

More preferably, said washer has at least one levelled radially inner surface and said end portion of said first element has at least one respective levelled radially outer surface configured to cooperate in abutment with said at least one levelled radially inner surface. Advantageously, in this way, the washer takes up a predetermined angular position and rotates as a unit with the first element.

Preferably, said plurality of grooves is made on both faces of said washer. This is in order to make the washer extremely quick and easy to be mounted, since no prior orientation of the washer is necessary.

Preferably, each groove of said plurality of grooves has a depth greater than or equal to about 0.05 mm, more preferably comprised between about 0.10 and about 0.30 mm.

In a preferred embodiment of the present invention, said first seat is sized to house, without radial interference, a sheath-head associated with said end portion of said first sheath. In this way, the first element can be rotated—during use of the bicycle and/or during adjustment of the tensioning of the cable—without setting the first sheath in rotation with it. Moreover, the provision of the sheath-head avoids that—during the rotation of the first element—the end portion of the first sheath is damaged and over time create interference with the first seat.

Preferably, said second seat is sized to house, with radial interference, said end portion of said second sheath, so as to achieve a stable coupling between adjustment device and protective sheath of the length of cable between control member and adjustment device.

BRIEF DESCRIPTION OF THE DRAWING(S)

Further features and advantages of the present invention will become clearer from the following detailed description of a preferred embodiment made with reference to the attached drawings where:

FIG. 1 schematically shows a longitudinal section view of a device for adjusting the tensioning of a control cable of a bicycle gearshift according to the prior art;

FIG. 2 schematically shows a perspective view of a device for adjusting the tensioning of a control cable of a bicycle gearshift according to the present invention;

FIG. 3 schematically shows a perspective view of a protective sheath of a cable intended to be associated with the device of FIG. 2 (the combination of FIGS. 2 and 3 define an exploded perspective view of the coupling between device of FIG. 2 and sheath of FIG. 3);

FIG. 4 schematically shows a top side view of the device of FIG. 2;

FIG. 5 schematically shows a longitudinal section view of the device of FIG. 2, taken according to the plane A-A of FIG. 4;

FIG. 6 schematically shows an enlarged-scale perspective view of a portion of the device of FIG. 2.

FIGS. 2-7 show the adjustment device of the present invention. Such a device is indicated with 10.

DETAILED DESCRIPTION OF A PREFERRED EMBODIMENT

Figure 1:
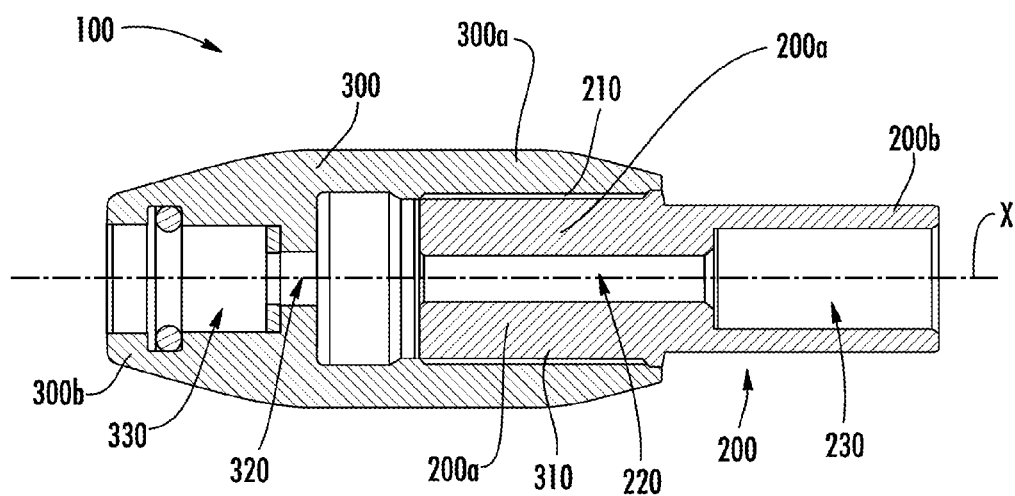
FIG. 1 shows the device 100 of the prior art described above.
Figure 5:
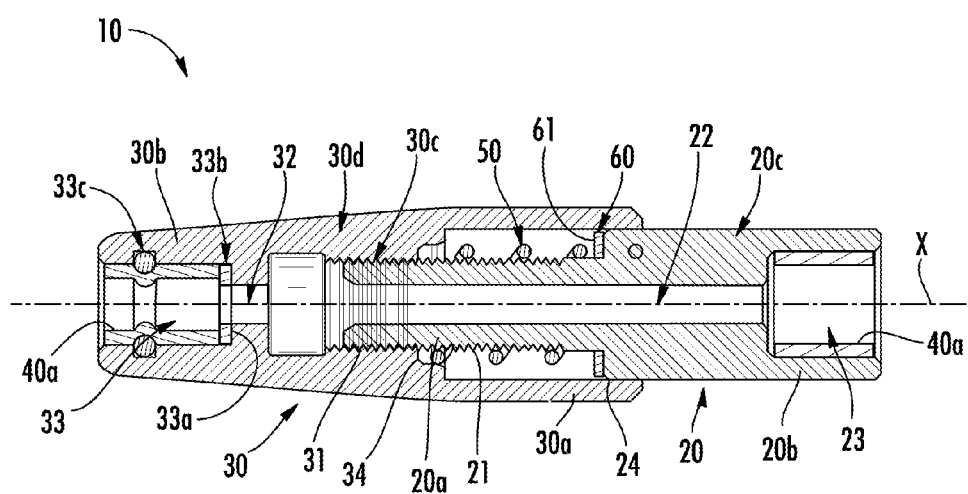

The adjustment device 10 is arranged in a position easily accessible by the cyclist.

The adjustment device 10 comprises a pair of elongated elements 20, 30, screwed to each other and extending along a longitudinal axis X.

Each element 20, 30 comprises a respective through cavity 22, 32 extending along the longitudinal axis X for the passage of the cable (not shown).

The element 20 comprises an end portion 20a provided with an outer threading 21.

The end portion 20a is substantially shaped like a stem and faces towards the second element 30. Such an end portion 20a has a substantially cylindrical outer shape and extends from a portion with larger diameter 20c, also substantially cylindrical in shape.

A shoulder 24 having a substantially annular shape is provided between the end portion 20a and the portion with larger diameter 20c.

At the opposite end portion 20b thereof, the element 20 has a housing seat 23 for housing an end portion 40a of a protective sheath 40 (shown in FIG. 3) of a first length of cable, namely the length of cable comprised between the thrusting member of the gearshift and the adjustment device 10. The opposite end portion of the aforementioned sheath 40 is associated with the thrusting member of the gearshift.

The housing seat 23 is sized to house, without radial interference, a sheath-head 41 associated with the end portion 40a of the sheath 40.

The sheath-head 41 is a component which is conventional and therefore is not described in detail hereafter.

Preferably, the clearance between housing seat 23 and sheath-head 41 has a value comprised between 0.08 mm and 0.15 mm, including the extreme values, and more preferably equal to about 0.10 mm.

The element 30 comprises a hollow central portion 30c, having a substantially cylindrical shape and provided with an inner threading 31 engaged with the outer threading 21 of the element 20.

The central portion 30c is formed in a body 30d that has opposite end portions 30a, 30b.

The end portion 30a is substantially shaped like a cup and faces towards the element 20.

Such an end portion 30a has an inner diameter that is greater than the outer diameter of the portion with larger diameter 20c of the element 20, so that a part of the aforementioned portion with larger diameter 20c is inserted in the end portion 30a of the element 30 when the end portion 20a of the element 20 is screwed into the central portion 30c of the element 30.

Preferably, the difference in diameter between end portion 30a of the element 30 and portion with larger diameter 20c of the element 20 is minimal, so that the end portion 30a acts as a sliding guide for the portion with larger diameter 20c during the screwing/unscrewing of the element 20 in the element 30.

A shoulder 34 having a substantially annular shape is provided between the end portion 30a of the element 30 and the central portion 30c of the element 30.

At the end portion 30b thereof distal with respect to the element 20, the element 30 comprises a housing seat 33 for housing an end portion of a protective sheath (not shown) of a second length of the cable, namely the length of cable comprised between the control member (typically arranged on the handlebars of the bicycle) and the adjustment device 10. The opposite end portion of the aforementioned sheath is associated with the control member.

The housing seat 33 is sized to house, with radial interference, the end portion of the aforementioned protective sheath, so as to achieve a stable coupling between the adjustment device 10 and the aforementioned protective sheath.

A washer 33b is provided on a bottom surface 33a of the housing seat 33. The outer face of the aforementioned protective sheath goes into abutment against the washer 33b.

Moreover, an O-ring 33c configured to prevent the entry of water inside the adjustment device 10 is housed in the housing seat 33.

The adjustment device 10 further comprises a helical spring 50 arranged substantially coaxially to the longitudinal axis X in a radially outer position with respect to the end portion 20a and in a radially inner position with respect to the end portion 30a.

The helical spring 50 is held in a compressed state between the shoulder 24 defined in the element 20 and the shoulder 34 defined in the element 30.

Figure 7:
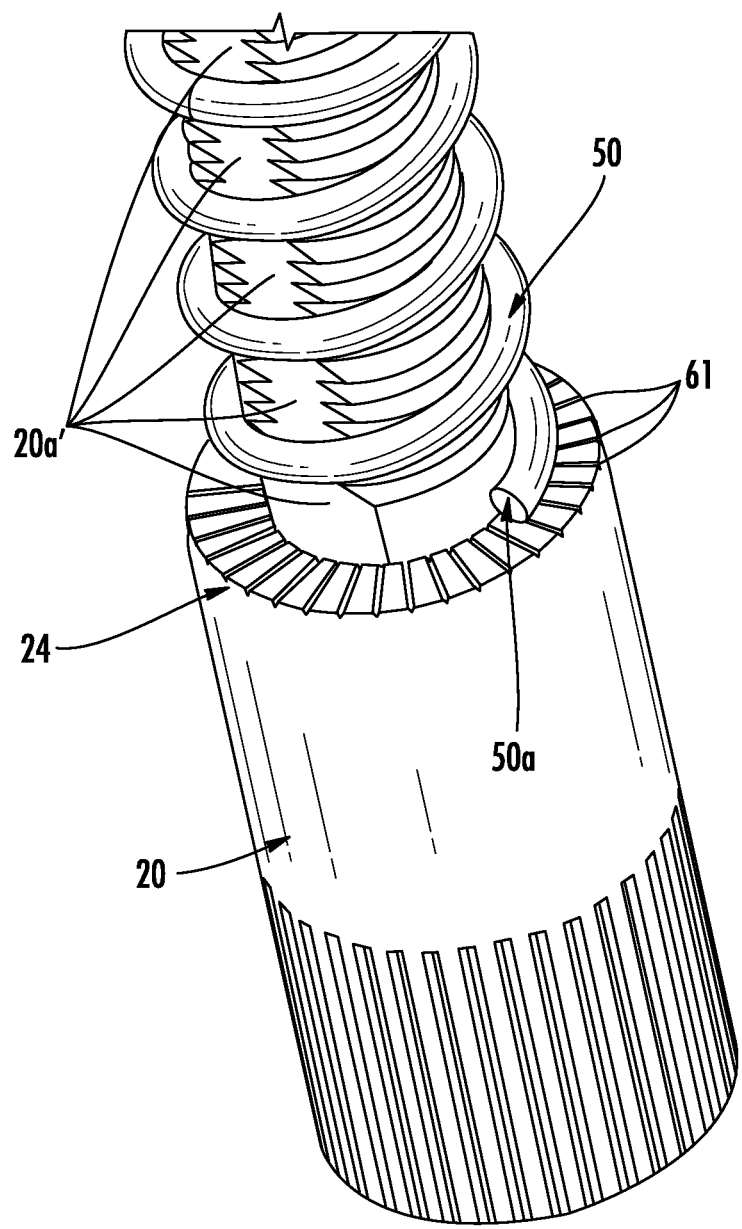
FIG. 7 is an enlarged-scale perspective view of an alternative embodiment of a portion of the device of FIG. 2 illustrating grooves formed directly on a shoulder.

At the shoulder 24, there is a plurality of grooves 61 (shown in FIG. 7, where for the sake of simplicity only some grooves have been indicated with 61) the function of which is to lock a free end 50a of the helical spring 50 in position.

The other free end of the helical spring 50, namely the one opposite the free end 50a, is locked in a predetermined position on the shoulder 34 of the element 30. For this purpose it is possible to provide a suitable locking seat or recess.

Figure 6:
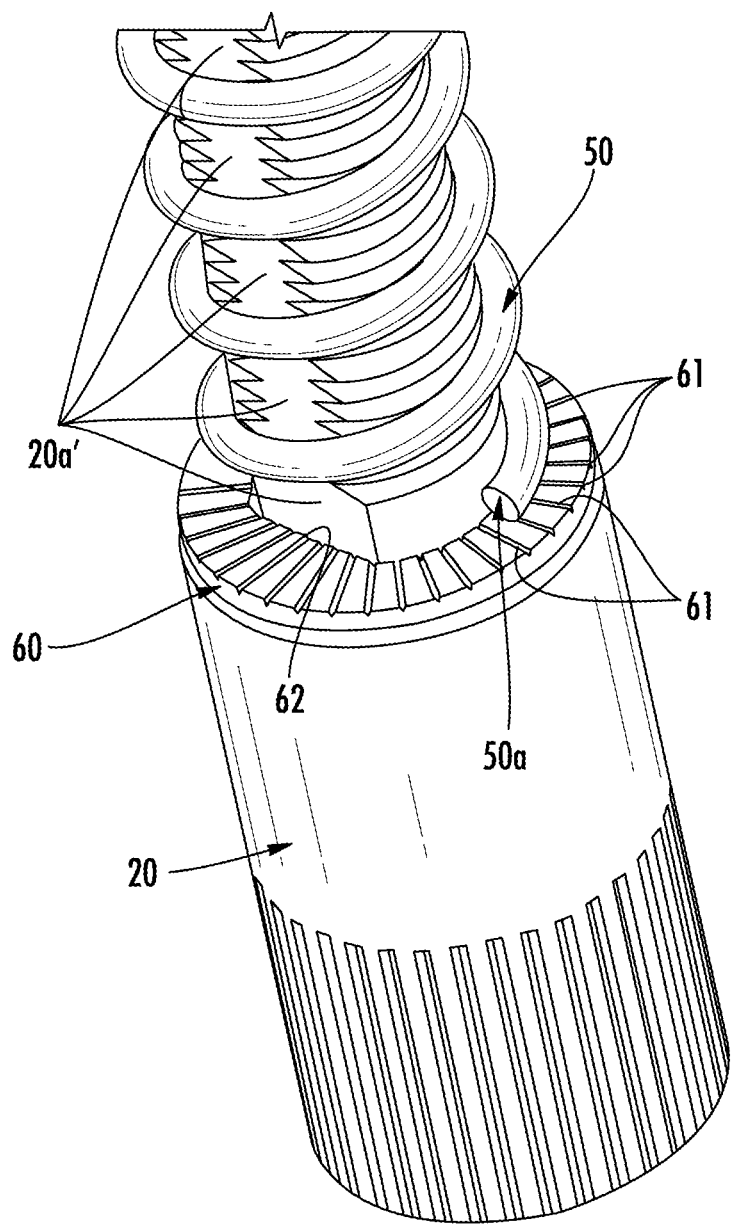

In the example illustrated in FIG. 6, the plurality of grooves 61 is made on a washer 60 that is pushed in abutment against the shoulder 24 by the helical spring 50.

As shown in FIG. 6, each groove 61 extends along a substantially radial direction with respect to the longitudinal axis X. The grooves 61 are preferably equally spaced apart in the circumferential direction, thus defining a substantially spoke-like pattern.

The grooves 61 are made on both faces of the washer 60, the grooves 61 of one face being arranged in an angularly offset position with respect to those of the other face. Preferably, each groove 61 of a face is angularly arranged between two adjacent grooves 61 of the other face.

Preferably, the grooves 61 cross the entire annular surface of the washer 60.

Preferably, each groove 61 has a depth greater than or equal to about 0.05 mm, more preferably comprised between about 0.10 and about 0.30 mm.

As shown in FIG. 6, the washer 60 has at least one levelled radially inner surface 62. The end portion 20a of the element 20 has at least one levelled radially outer surface 20a' that cooperates in abutment with the levelled radially inner surface 62 of the washer 60. In this way, the washer 60 takes up a predetermined angular position and rotates as a unit with the element 20.

The levelled radially outer surface 20a' of the element 20 also extends in that part of the end portion 20a provided with outer threading 21, so that the thread of the outer threading 21 is interrupted, every turn, at the levelled radially outer surface 20a'. In this way, during the assembly operations, the washer 60 is guided by the end portion 20a of the element 20 until it reaches the shoulder 24.

The use of the adjustment device 10, while being already clear from what has been stated above, is described further hereafter.

In the assembly step, the cable is passed inside the control member until it is connected, with a predetermined tension, to the thrusting member by passing inside the adjustment device 10. A sheath of predetermined length is inserted in the seat 33 of the element 30 and fixed to the control member. On the other side of the adjustment device 10, the sheath-head 41 of the sheath 40 (also having a predetermined length) is inserted in the seat 23 of the element 20 and fixed to the gearshift. The two protective sheaths are placed under tension, by screwing or unscrewing the element 20 with respect to the element 30, so as to achieve the optimal tensioning condition.

The helical spring 50, held in a compressed state between the shoulders 24 and 34 defined in the elements 20 and 30, determines a significant friction between the threadings 21 and 31 of the two elements 20 and 30.

When after use of the bicycle there is a loss of tension of the cable, it is possible to intervene on the adjustment device 10 to restore the optimal tensioning condition. In this case, the element 20 is screwed/unscrewed with respect to the element 30, so as to move the protective sheath 40 of the section of cable extending between adjustment device 10 and thrusting member. The movement of the sheath 40 results in a movement of the thrusting member and the consequent movement of the cable until it is brought back to the optimal tensioning condition.

During the restoration of the optimal tensioning condition of the cable, the cyclist exerts a force on the element 20 such as to ensure that the free end 50a of the helical spring 50 (which during normal use of the bicycle on the road is locked in one of the grooves 61, so as to prevent any mutual rotation between element 20 and element 30) comes out from the groove 61 to then be locked in another groove 61.

It is also possible to provide only two grooves 61, while a greater number of grooves ensures better precision of adjustment.

Of course, those skilled in the art can bring numerous modifications and changes to the device for adjusting the tensioning of a control cable of a bicycle gearshift described above, in order to satisfy specific and contingent requirements, all of which are in any case within the scope of protection of the present invention as defined by the following claims.

What is claimed is:

1. An adjustment device for adjusting the tensioning of a control cable of a bicycle gearshift, the device comprising: a pair of elements coupled to each other through respective circumferential threadings each having a circumferential thread that extends around and along a longitudinal axis, each element of said pair of elements comprising a respective through cavity extending along said longitudinal axis for passage of a control cable, wherein:

a first element of said pair of elements comprises an end portion provided with an outer circumferential threading and, at an opposite end portion of said first element, a first housing seat dimensioned to house an end portion of a first protective sheath of a first length of said control cable;

a second element of said pair of elements comprises a hollow portion provided with an inner circumferential threading engaged with said outer circumferential threading and, at a free end portion of said second element distal from said first element, a second housing seat dimensioned to house an end portion of a second protective sheath of a second length of said control cable; and, said adjustment device further comprising a helical spring arranged coaxially to said outer threading and held in a compressed state between a first shoulder defined in said first element and a second shoulder defined in said second element and, at at least one of said first and second shoulders, a plurality of locking grooves that engage a respective free end of said helical spring, said helical spring urging the thread of the outer circumferential threading and the thread of the inner circumferential threading against each other.

2. The adjustment device according to claim 1, wherein each groove of said plurality of grooves extends along a substantially radial direction with respect to said longitudinal axis.

3. The adjustment device according to claim 1 wherein said plurality of grooves is made on a washer which is in abutment on one of said first and second shoulders.

4. The adjustment device according to claim 3, wherein said washer in abutment on said first shoulder.

5. The adjustment device according to claim 4, wherein said washer has at least one levelled radially inner surface and said end portion of said first element has at least one respective levelled radially outer surface configured to cooperate in abutment with said at least one levelled radially inner surface.

6. The adjustment device according to claim 3, wherein said plurality of grooves is made on both faces of said washer.

7. The adjustment device according to claim 1, wherein said plurality of grooves is made on said first shoulder.

8. The adjustment device according to claim 1, wherein each groove of said plurality of grooves has a depth greater than or equal to about 0.05 mm.

9. The adjustment device of claim 1, wherein said first seat is sized to house, without radial interference, a sheath-head associated with said end portion of said first sheath.

10. The adjustment device of claim 1, wherein said second seat is sized to house, with radial interference, said end portion of said second sheath.

* * * * *